(12) United States Patent
Kim et al.

(10) Patent No.: US 11,457,314 B2
(45) Date of Patent: Sep. 27, 2022

(54) METHOD, TERMINAL AND TERMINAL CASE FOR CONVERTING SOUND DATA

(71) Applicant: Samsung Electronics Co., Ltd., Suwon-si (KR)

(72) Inventors: Yangwook Kim, Suwon-si (KR); Woohyun Nam, Suwon-si (KR); Seungho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 176 days.

(21) Appl. No.: 16/727,346

(22) Filed: Dec. 26, 2019

(65) Prior Publication Data

US 2020/0213736 A1    Jul. 2, 2020

(30) Foreign Application Priority Data

Dec. 26, 2018 (KR) .................. 10-2018-0169525

(51) Int. Cl.
| | |
|---|---|
| H04R 5/027 | (2006.01) |
| H04M 1/215 | (2006.01) |
| H04R 1/40 | (2006.01) |
| H04S 1/00 | (2006.01) |
| G06N 3/08 | (2006.01) |
| G06N 3/04 | (2006.01) |
| H04R 3/00 | (2006.01) |

(52) U.S. Cl.
CPC ............... *H04R 5/027* (2013.01); *G06N 3/04* (2013.01); *G06N 3/08* (2013.01); *H04M 1/215* (2013.01); *H04R 1/406* (2013.01); *H04R 3/005* (2013.01); *H04S 1/007* (2013.01); *H04S 2400/15* (2013.01)

(58) Field of Classification Search
CPC ........ H04R 5/027; H04R 1/406; H04R 3/005; H04R 1/326; G06N 3/04; G06N 3/08; H04M 1/215; H04M 1/72454; H04M 1/6008; H04S 1/007; H04S 2400/15; A45C 11/00; A45C 2011/002
See application file for complete search history.

(56) References Cited

U.S. PATENT DOCUMENTS

| | | | | |
|---|---|---|---|---|
| 5,031,216 A | * | 7/1991 | Gorike ................... | H04R 5/027 381/26 |
| 8,204,246 B2 | * | 6/2012 | Marton .................. | H04R 31/00 381/94.2 |
| 8,428,665 B1 | * | 4/2013 | McLaughlin ........... | H04M 1/04 455/90.3 |
| 9,131,305 B2 | | 9/2015 | Li et al. | |
| 9,241,055 B1 | * | 1/2016 | Barker .................... | H04M 1/04 |
| 9,967,693 B1 | | 5/2018 | Seamans | |

(Continued)

FOREIGN PATENT DOCUMENTS

| | | |
|---|---|---|
| KR | 10-1195649 | 10/2012 |
| KR | 10-1896406 | 10/2018 |

*Primary Examiner* — Oyesola C Ojo
(74) *Attorney, Agent, or Firm* — Staas & Halsey LLP

(57) ABSTRACT

Provided are an artificial intelligence (AI) system using a machine learning algorithm such as deep learning and an application of the AI system. Provided is a method of converting sound data, the method including acquiring binaural sound data; converting the binaural sound data by using a pre-generated training network model, based on a parameter indicating a context at a time of acquiring the binaural sound data; and outputting the converted binaural sound data.

9 Claims, 11 Drawing Sheets

(56) References Cited

U.S. PATENT DOCUMENTS

| | | | | |
|---|---|---|---|---|
| 2011/0170725 A1* | 7/2011 | Liu | ................... | H04R 1/02 |
| | | | | 381/338 |
| 2015/0156583 A1* | 6/2015 | Mulumudi | ............ | G10K 11/26 |
| | | | | 381/67 |
| 2015/0189058 A1 | 7/2015 | Hwang | | |
| 2015/0326987 A1 | 11/2015 | Marrin | | |

* cited by examiner

METHOD, TERMINAL AND TERMINAL CASE FOR CONVERTING SOUND DATA

CROSS-REFERENCE TO RELATED APPLICATION

This application is based on and claims priority under 35 U.S.C. § 119 to Korean Patent Application No. 10-2018-0169525, filed on Dec. 26, 2018, in the Korean Intellectual Property Office, the disclosure of which is incorporated by reference herein in its entirety.

BACKGROUND

1. Field

Embodiments of the disclosure relate to a method, terminal and terminal case for converting sound data.

2. Description of Related Art

An artificial intelligence (AI) system is a computer system configured to implement human-level intelligence and get smarter by training itself and making determinations spontaneously, unlike an existing rule-based smart system. Because a recognition rate of the AI system improves and the AI system more accurately understands a user's taste as it is increasingly used, the rule-based smart system is being gradually replaced by a deep learning-based AI system.

AI technology includes machine learning (e.g., deep learning) and element technologies using the machine learning.

Machine learning is an algorithm technology that self-classifies/learns characteristics of input data, and element technologies are technologies using a machine learning algorithm such as deep learning to simulate functions of a human brain such as recognition and determination, and include technical fields such as linguistic understanding, visual understanding, inference/prediction, knowledge representation, and motion control.

Various fields to which AI technology is applied are as follows. Linguistic understanding is a technology for recognizing and applying/processing human languages/characters and includes natural language processing, machine translation, dialog systems, question answering, and voice recognition/synthesis. Visual understanding is a technology for recognizing and processing objects like a human visual system and includes object recognition, object tracking, image searching, person recognition, scene understanding, spatial understanding, and image enhancement. Inference/prediction is a technology for judging information and logically inferring and predicting the same and includes knowledge/probability-based reasoning, optimization prediction, preference-based planning, and recommendation. Knowledge representation is an automation technology for incorporating human experience information into knowledge data and includes knowledge building (e.g., data generation/classification), and knowledge management (e.g., data utilization). Motion control is a technology for controlling self-driving of autonomous vehicles and the motion of robots and includes movement control (e.g., navigation, collision avoidance, or driving), and manipulation control (e.g., behavior control). However, this is merely one example of artificial intelligence technology, and sound or audio conversion may be included in the artificial intelligence technology.

SUMMARY

An embodiment of the disclosure provides a terminal case coupled to a terminal to perform binaural sound recording. Also, another embodiment of the disclosure provides a method, performed by a terminal, of converting binaural sound data, based on a context at a time of acquiring the binaural sound data.

Additional aspects will be set forth in part in the description which follows and, in part, will be apparent from the description, or may be learned by practice of the presented embodiments of the disclosure.

According to an embodiment of the disclosure, a terminal case coupled to a terminal including a plurality of microphones includes: a cover surrounding at least one of a left side surface, a right side surface, an upper side surface, a lower side surface, or a rear surface of the terminal; a cover hole disposed on one surface of the cover which is in contact with each surface of the terminal on which a microphone hole is disposed; and a sound collector having an asymmetrical shape and arranged on each surface of the cover, on which the cover hole is disposed, and configured to collect sound and cause resonance, reflection, or diffraction of the collected sound, wherein the cover hole is configured to allow sound to flow into the microphone hole.

According to an embodiment of the disclosure, a method, performed by a terminal, of converting sound data may include: acquiring binaural sound data; converting the binaural sound data by using a pre-generated training network model based on a parameter indicating a context at a time of acquiring the binaural sound data; and outputting the converted binaural sound data.

According to an embodiment of the disclosure, a terminal for converting sound data includes: a memory storing one or more instructions; an output unit; and at least one processor configured to execute the one or more instructions stored in the memory, wherein the at least one processor may acquire, by executing the one or more instructions, binaural sound data, convert the binaural sound data by using a pre-generated training network model based on a parameter indicating a context at a time of acquiring the binaural sound data, and output the converted binaural sound data.

According to an embodiment of the disclosure, a computer program product may include a recording medium storing a program for: acquiring binaural sound data; converting the binaural sound data by using a pre-generated training network model based on a parameter indicating a context at a time of acquiring the binaural sound data; and outputting the converted binaural sound data.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
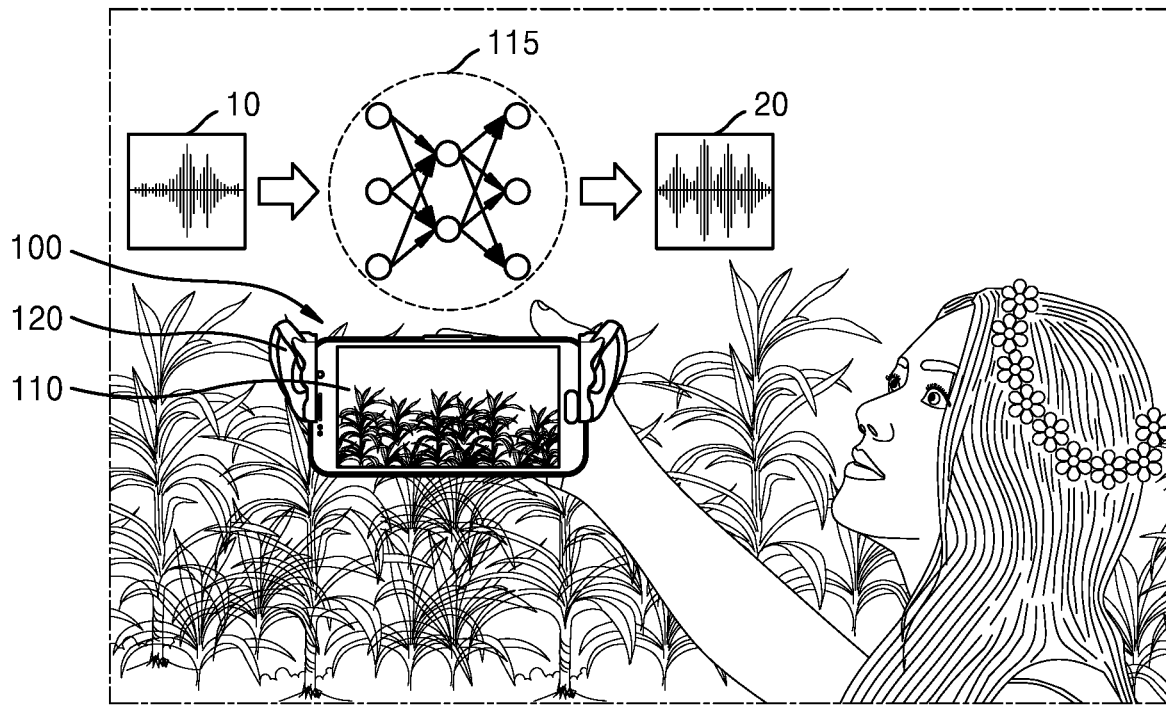
FIG. 1 is a diagram for describing a method of converting sound data, according to an embodiment of the disclosure.

Terms used in the specification will be briefly described and the disclosure will now be described in detail.

The terms used in the disclosure have been selected as widely used general terms as possible in consideration of functions of elements in the disclosure, but this may vary according to intentions of one of ordinary skill in the art, precedents, or new technologies. Also, in certain cases, there are terms arbitrarily selected by the applicant, in which case the meaning will be described in detail in the detailed description of the disclosure. Therefore, the terms used herein should be defined based on the meanings of the terms and the contents throughout the disclosure, not merely the names of the terms.

Terms including ordinal numbers such as first and second may be used to describe various elements, but the elements are not limited by the terms. The terms are only used to distinguish one element from another. For example, a first element may be referred to as a second element without departing from the scope of claims of the disclosure, and similarly, the second element may also be referred to as the first element. The term "and/or" includes any one of a plurality of related items or a combination of the plurality of related items.

Throughout the specification, it will be understood that when a part "includes" or "comprises" an element, unless otherwise defined, the part may further include other elements, not excluding the other elements. Also, the term "unit" as used in the specification refers to a software element and a hardware element such as field programmable gate array (FPGA) or application specific integrated circuit (ASIC), and the "unit" serves a certain role. However, the meaning of the "unit" is not limited to software or hardware. The "unit" may be configured to be in an addressable storage medium or may be configured to play one or more processors. Accordingly, as an example, a "unit" refers to elements such as software elements, object-oriented software elements, class elements, and task elements, processes, functions, properties, procedures, subroutines, segments of a program code, drivers, micro codes, circuits, data, databases, data structures, tables, arrays and variables. The functionality provided within the elements and the "units" may be combined into a smaller number of elements and "units" or further separated into additional elements and "units."

Throughout the disclosure, the expression "at least one of a, b or c" indicates only a, only b, only c, both a and b, both a and c, both b and c, all of a, b, and c, or variations thereof.

Hereinafter, embodiments of the disclosure will be described in detail in order to fully convey the scope of the disclosure and enable one of ordinary skill in the art to easily embody and practice the disclosure. The embodiments of the disclosure may be implemented in various forms and the disclosure is not limited thereto. Also, parts in the drawings unrelated to the detailed description are omitted to ensure clarity of the disclosure, and like reference numerals in the drawings denote like elements.

Sound may be expressed as an audio, an audio signal, a sound, or a sound signal, which will be described hereinafter as sound data or sound.

FIG. 1 is a diagram for describing a method of converting sound data, according to an embodiment of the disclosure.

Referring to FIG. 1, a sound conversion system 100 according to the embodiment of the disclosure may include a terminal 110 and a terminal case 120. However, this is merely an example, and according to another embodiment of the disclosure, the sound conversion system 100 may only include the terminal 110. In the present embodiment of the disclosure, it is assumed that the terminal 110 acquires sound data in a state of being inserted into the terminal case 120.

The terminal 110 according to an embodiment of the disclosure may perform binaural recording by collecting sound through the terminal case 120. Binaural recording is a technique for recording sound using principles such as a sound phase difference or time difference between two ears, sound reflection or diffraction by auricles, etc., and the recorded sound is significantly high in realism and presence. In the present embodiment of the disclosure, as the sound generated around the terminal 110 through the terminal case 120, a change in sound characteristics such as amplitude, frequency and phase may occur in the recorded sound. The structure of the terminal case 120 that causes a change in the characteristics of sound will be described at a later time in detail with reference to FIGS. 3A and 3B.

Hereinafter, sound data acquired by the terminal 110 will now be described as binaural sound data 10.

The terminal 110 according to an embodiment of the disclosure may convert the binaural sound data 10 acquired by the terminal 110 by using a previously generated training network model 115. In particular, the terminal 110 may input a parameter indicating a context at a time of acquiring the binaural sound data 10 into the training network model 115 and reflect the parameter in the conversion. In this regard, the context may include at least one of characteristics and arrangement positions of a plurality of microphones included in the terminal 110, a form and a material of the terminal case 120 into which the terminal 110 is inserted, or a source of the binaural sound data 10.

For example, the characteristics of the microphone may include a frequency response, sensitivity, and direction of the microphone. Also, the arrangement position of the microphone may include a surface and a position on which a microphone hole for introducing sound data is disposed in the microphone, a distance between the plurality of microphones, and the like. The form and material of the terminal case 120 will be described at a later time with reference to FIGS. 3A and 3B. The source of the binaural sound data 10 refers to a source of generation of sound, for example, food, natural environment, indoors, and outdoors.

The terminal 110 according to another embodiment of the disclosure may convert the binaural sound data 10 by using the training network model 115 based on a parameter indicating a degree of conversion, a conversion effect, and the like intended by a user, in addition to the context.

The terminal 110 may output converted binaural sound data 20.

The terminal 110 according to an embodiment of the disclosure may include smartphones, tablet PCs, smart TVs, mobile phones, personal digital assistants (PDAs), media players, home appliances, and other mobile or non-mobile computing devices, but is not limited thereto.

Figure 2:
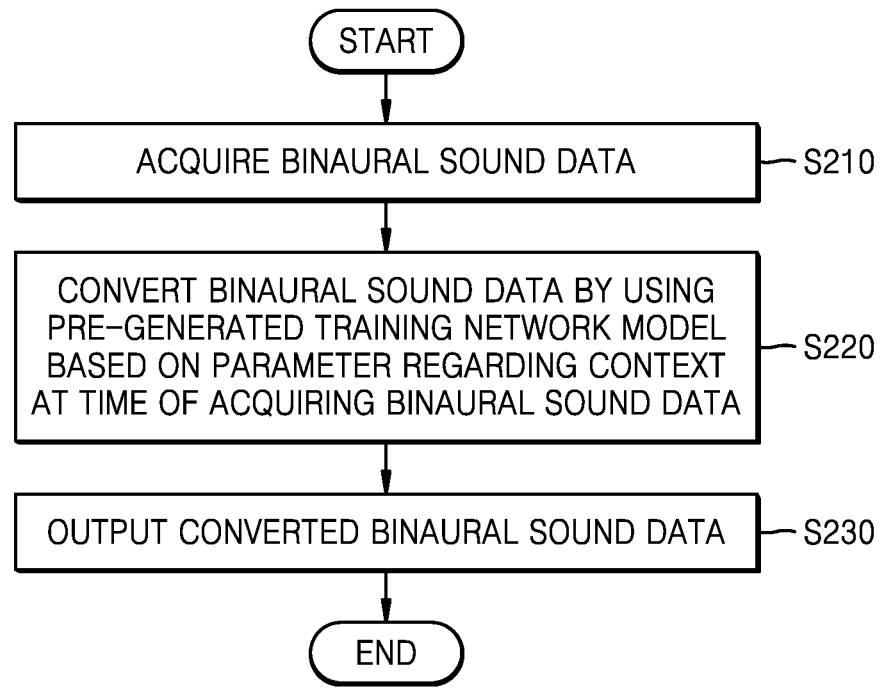
FIG. 2 is a flowchart of a method, performed by a terminal, of converting sound data, according to an embodiment of the disclosure.

FIG. 2 is a flowchart of a method, performed by a terminal, of converting sound data, according to an embodiment of the disclosure.

In S210, the terminal may acquire binaural sound data.

The terminal according to an embodiment of the disclosure may record sound generated around the terminal by using a plurality of microphones. In this regard, the terminal may acquire binaural sound data as a result of recording sound in a state of being inserted into a terminal case designed to implement a change in sound characteristics or a phase difference between two ears.

However, the aforementioned embodiment is merely an example, and the method for converting sound data according to the disclosure is not limited to recording sound in a state where the terminal is inserted into the terminal case.

In S220, the terminal may convert binaural sound data by using a previously generated training network model based on a parameter indicating a context at a time of acquiring the binaural sound data.

The terminal according to an embodiment of the disclosure may store a training network model capable of performing conversion suitable for the binaural sound data in consideration of the context at the time of acquiring the binaural sound data. For example, when information corresponding to a characteristic of a microphone included in the terminal, an arrangement position of the microphone, etc. is input as a parameter to the training network model, a structure of a layer and a parameter of the layer suitable for conversion may be determined, in consideration of a characteristic and an arrangement position of a microphone in which binaural sound data is recorded.

However, the aforementioned embodiment is merely an example, and as described above with reference to FIG. 1, the form and material of the terminal case into which the terminal is inserted, the source of the binaural sound data, etc. may be used as the parameter indicating the context.

Also, according to another embodiment of the disclosure, the terminal may apply setting information regarding a degree of conversion and a direction of conversion of the binaural sound data intended by the user as an input parameter.

As a result output from the training network model, binaural sound data to which a conversion method optimized for binaural sound data recorded by the terminal may be output, but as another example, a conversion method for the recorded binaural sound data may be acquired by using a probability value. In this case, the user may request to convert the binaural sound data using a conversion method with the highest probability value, or the terminal may automatically convert the binaural sound data by the conversion method with the highest probability value.

In S230, the terminal may output the converted binaural sound data. For example, the terminal may store the converted binaural sound data and inform the user that the conversion is completed. Accordingly, when an input requesting reproduction of the converted binaural sound data is received from the user, the terminal may output the converted binaural sound data.

Figure 3A:
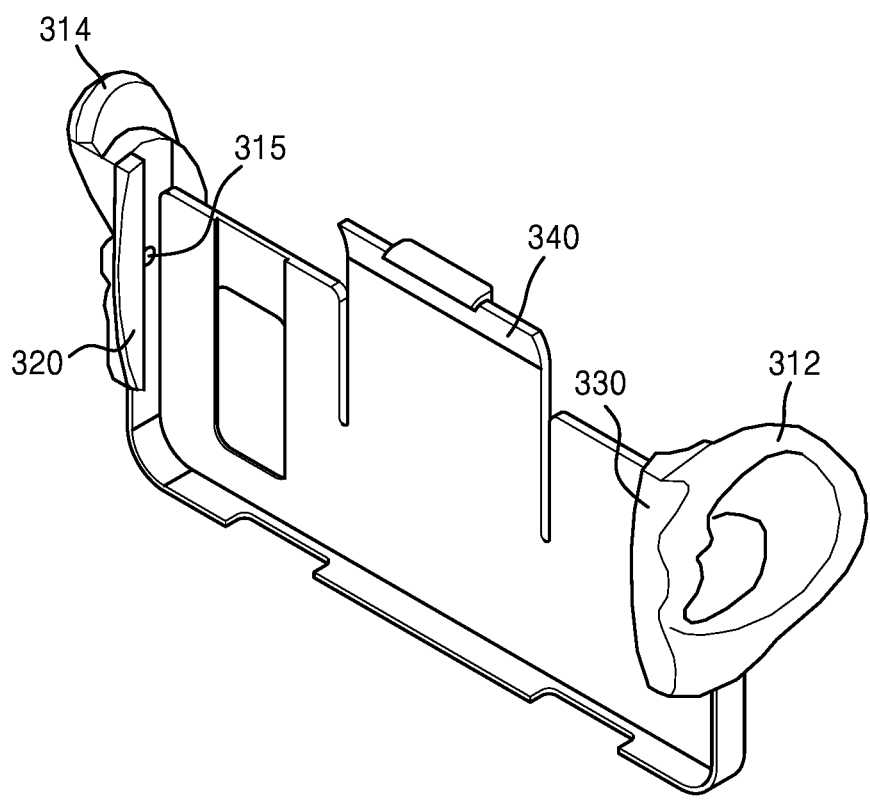
FIG. 3A is a diagram illustrating the structure of a terminal case, according to an embodiment of the disclosure.
Figure 3B:
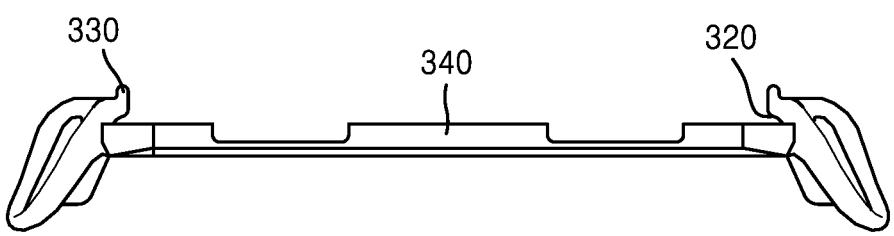
FIG. 3B is a diagram illustrating the structure of a terminal case, according to an embodiment of the disclosure.

FIG. 3A is a diagram illustrating the structure of a terminal case according to an embodiment of the disclosure. FIG. 3B is a diagram illustrating the structure of a terminal case according to an embodiment of the disclosure.

Referring to FIG. 3A, the terminal case may include a plurality of sound collectors 312 and 314, a cover hole 315, a guide protrusion 320, a plate body 330, and a cover 340. However, the aforementioned embodiment is merely an example, and the terminal case may include fewer or more elements than the aforementioned elements. For example, the terminal case may include a plurality of sound collectors 312 and 314, a cover hole 315, and a cover 340.

According to an embodiment of the disclosure, each of the plurality of sound collectors 312 and 314 may be arranged on each surface on which a cover hole 315 is disposed in a cover 340 which covers at least one of a left side surface, a right side surface, an upper side surface, a lower side surface, or a rear surface of the terminal. The sound collector (e.g., 314) may collect sound to facilitate inflow of sound into the microphone hole of the terminal. In addition, the sound collector (e.g., 314) has an asymmetrical shape and may cause resonance, reflection, or diffraction of the collected sound. As an example, the sound collector (e.g., 314) may have a non-equivariant free curve shape in which the area is widened in a height direction from the cover hole 315. An example of non-equivariant free curve shape may include a shape of an auricle of a human body.

A cover hole 315 may be disposed on one surface of the cover 340 to which the sound collector (e.g., 314) is connected. In the preset embodiment of the disclosure, the cover hole 315 disposed on one surface of the cover 340 to which a second sound collector 314 of the plurality of sound collectors 312 and 314 is connected is described as an example, but a cover hole (not shown) may be disposed on one surface of the cover 340 to which a first sound collector 312 is connected.

The cover hole 315 according to an embodiment of the disclosure may be disposed on one surface of a cover which is in contact with one surface on which a microphone hole is disposed, of surfaces of the terminal, and may expose the microphone hole to the outside such that sound may be introduced into the microphone hole. Also, because the aforementioned first sound collector 312 is arranged around the cover hole 315, sound collected by the first sound collector 312 may be introduced through the cover hole 315.

The guide protrusion 320 according to an embodiment of the disclosure is connected to one surface of the cover 340 on which the cover hole 315 is disposed, and may guide the terminal to slide into the cover 340. Also, the guide protrusion 320 may serve to fix the terminal by maintaining an insertion state of the terminal after the terminal is inserted into the cover 340. Because a plurality of cover holes may be disposed in the terminal case, a plurality of guide protrusions may be included in the terminal case.

The plate body 330 according to an embodiment of the disclosure may protrude toward a front surface of the sound collector (e.g., 312) to reflect sound around the sound collector (e.g., 312). In the present embodiment of the disclosure, only one plate body 330 is described as an example, but a plate body may be disposed toward each front surface of the plurality of sound collectors 312 and 314.

Also, as the plate body 330 protrudes toward the front surface of the sound collector (e.g., 312), an appropriate sense of space may be created around the sound collector (e.g., 312).

Also, the guide protrusion 320 and the plate body may be integrally disposed.

The cover 340 according to an embodiment of the disclosure may cover at least one of a left side surface, a right side surface, an upper side surface, a lower side surface, or a rear surface of the terminal. The cover 340 and the aforementioned plurality of sound collectors 312 and 314, guide protrusion 320, and plate body 330 may be formed of materials different from each other. For example, the cover 340 may be made of plastic and the plurality of sound collectors 312 and 314, the guide protrusion 320, and the plate body 330 may be made of silicon, but this is merely an example, and each of the elements may be formed of different materials or the same material.

FIG. 3B is a perspective view of a terminal case to help understand the structure of the elements described above in FIG. 3A, showing a cover 340, a plate body 330 protruding toward a front surface of a first sound collector 312 arranged in the cover 340, and a guide protrusion 320 connected to one surface of the cover 340 in which a second sound collector 314 is disposed.

Figure 4:
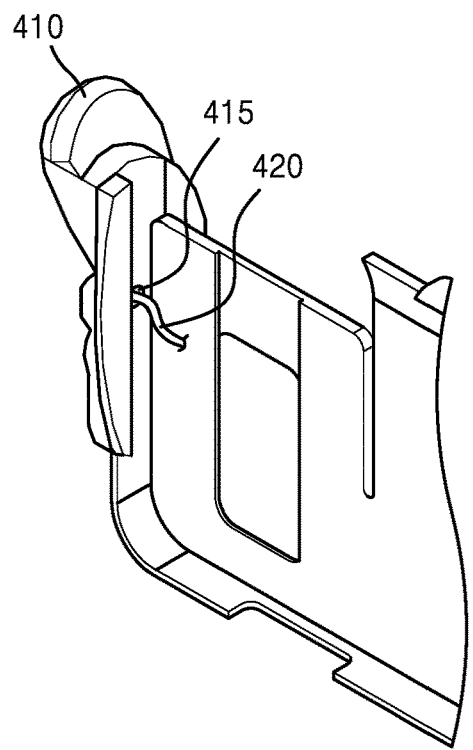
FIG. 4 is a diagram illustrating an acoustic tube provided in a terminal case, according to an embodiment of the disclosure.

FIG. 4 is a diagram illustrating an acoustic tube 420 provided in a terminal case, according to an embodiment of the disclosure.

In FIG. 4, in order to describe a form in which the acoustic tube 420 is connected to the terminal case, a sound collector 410 and a cover hole 415, which are a part of the terminal case, are shown but are only a part of the elements constituting the terminal case, and the terminal case is not limited to only the aforementioned elements.

According to an embodiment of the disclosure, when microphone holes respectively disposed on upper and lower surfaces of the terminal are positioned on different reference lines, the plurality of sound collectors provided in the terminal case may be positioned on different reference lines in order to transmit sound to the microphone holes. However, in this case, because a phase difference of sound recorded by each microphone of the terminal is not the same as sound recognized by ears of a human, the quality of binaural sound data acquired by the terminal may deteriorate.

To solve this problem, in the terminal case according to an embodiment of the disclosure, the positions of the sound collectors on both sides of the terminal case may be arranged on the same reference line, and the acoustic tube 420 may be used to connect the cover hole 415 to a microphone hole (not shown) of the terminal case, thereby transmitting sound.

Figure 5:
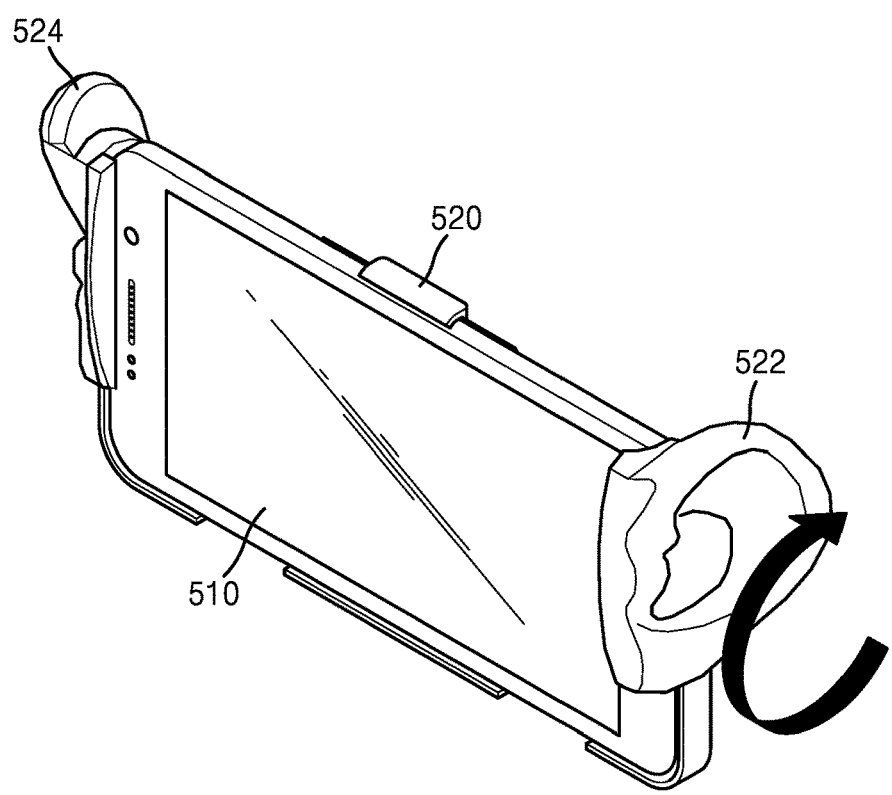
FIG. 5 is a diagram for describing operations of a sound collector of a terminal case, according to an embodiment of the disclosure.

FIG. 5 is a diagram for describing operations of sound collectors 522 and 524 of a terminal case 520, according to an embodiment of the disclosure.

In FIG. 5, only sound collectors 522 and 524, which are a part of the elements of the terminal case 520, are illustrated in order to describe the operations of the sound collectors 522 and 524 arranged in the terminal case 520. Operations of other elements may be the same as described above with reference to FIG. 3A.

As a terminal 510 is inserted into the terminal case 520, sound collected through a first sound collector 522 and a second sound collector 524 arranged on both sides of the terminal case 520 may be introduced into a microphone hole of the terminal through a cover hole. Arrangement directions of the first sound collector 522 and the second sound collector 524 arranged in the terminal case 520 according to an embodiment of the disclosure may be determined according to a direction in which the terminal 510 is inserted into the terminal case 520.

For example, the first sound collector 522 and the second sound collector 524 may be rotated by being attached to a cover of the terminal case 520 through a rotating plate, respectively. Accordingly, when the terminal 510 is inserted into the terminal case 520 for a screen of the terminal 510 to face in a first direction, the first sound collector 522 and the second sound collector 524 may be placed for front surfaces thereof to face in the first direction. When the terminal 510 is inserted into the terminal case 520 for the screen of the terminal 510 to face in a second direction, the user may rotate the rotating plate to change arrangement directions of the first sound collector 522 and the second sound collector 524 for the front surfaces thereof to face in the second direction.

Figure 6:
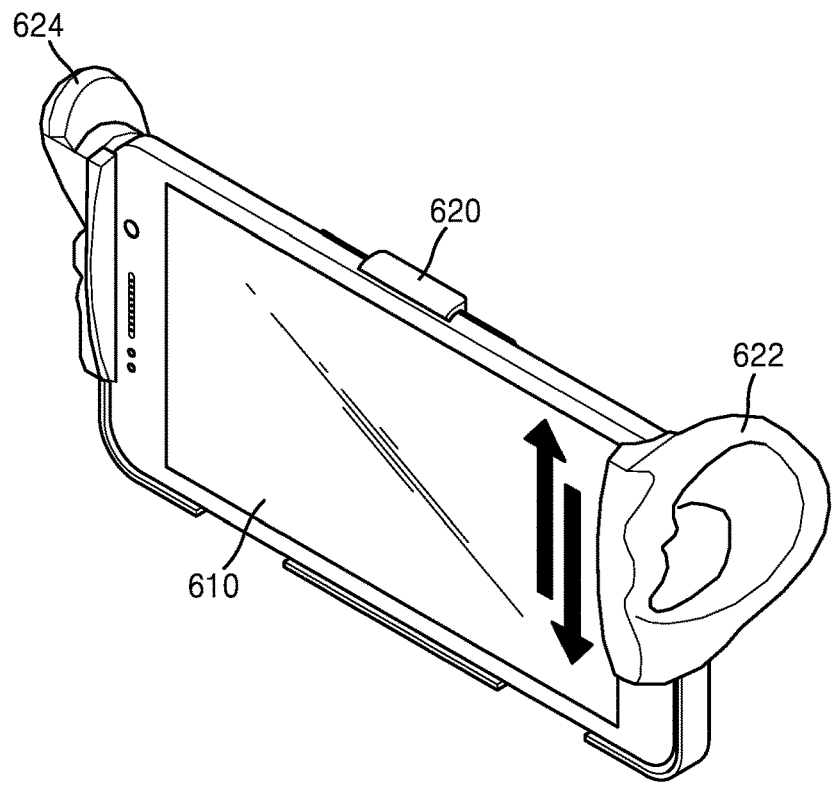
FIG. 6 is a diagram for describing operations of a sound collector of a terminal case, according to another embodiment of the disclosure.

FIG. 6 is a diagram for describing operations of sound collectors 622 and 624 of a terminal case 620, according to another embodiment of the disclosure.

In FIG. 6, only sound collectors 622 and 624, which are a part of the elements of the terminal case 620, are illustrated in order to describe the operations of the sound collectors 622 and 624 arranged in the terminal case 620. Operations of other elements may be the same as described above with reference to FIG. 3A.

The position where a microphone hole is disposed may vary depending on the type of a terminal inserted into the terminal case 620. In particular, the microphone hole may be positioned on the same reference line in each side of the terminal, or may be positioned on different reference lines.

In the case of the terminal case 620, in order for sound to be recorded in the terminal, the arrangement of the sound collectors 622 and 624 of the terminal case 620 is required to correspond to the position of the microphone hole of the terminal. Accordingly, when the position where the microphone hole is disposed is different for each terminal, it is necessary to change the positions of the sound collectors 622 and 624 to arrange the sound collectors 622 and 624 to correspond to the microphone hole.

In the case of the terminal case 620 according to an embodiment of the disclosure, a sliding plate may be included between a cover and the sound collectors 622 and 624 in order for the sound collectors 622 and 624 to slide in a vertical direction. Accordingly, the user may slide the sound collectors 622 and 624 in the vertical direction in accordance with the position of the microphone hole of the terminal 610.

Also, the terminal case 620 may further include a fixing device such as a fixing pin in order for the user to slide the sound collectors 622 and 624 in the vertical direction to fix the same at desired positions.

Figure 7:
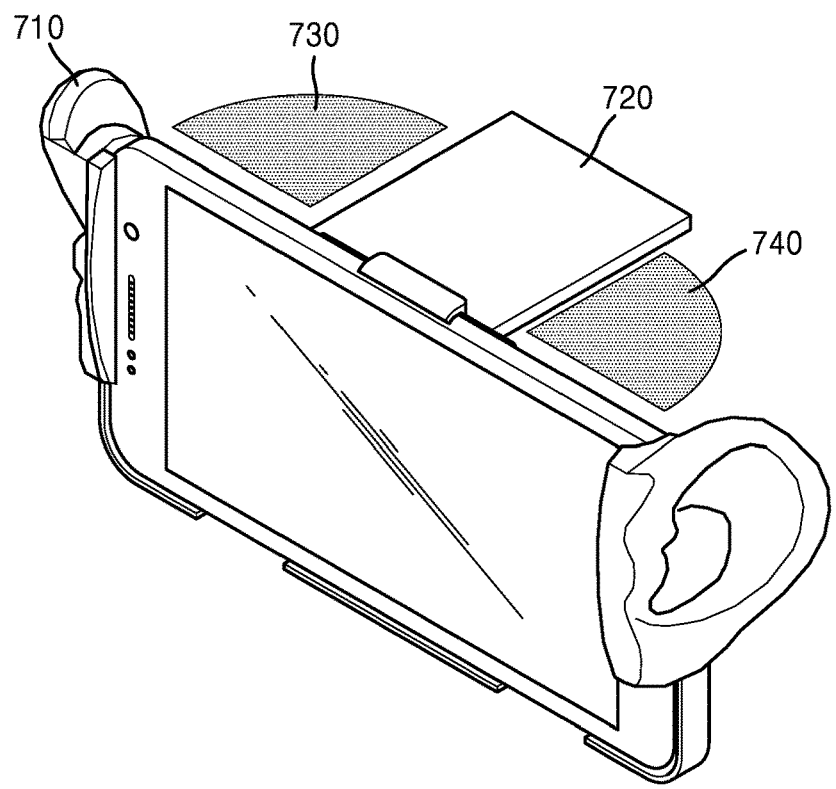
FIG. 7 is a diagram illustrating a foldable disk connected to a terminal case, according to an embodiment of the disclosure.

FIG. 7 is a diagram illustrating a foldable disk 720 connected to a terminal case 710, according to an embodiment of the disclosure.

Referring to FIG. 7, the foldable disk 720 may be connected to a rear surface of a cover of the terminal case 710. The foldable disk 720 may maximize separation of left and right spaces 730 and 740 when sound is collected. In particular, the directivity of sound mid-high ranges may be improved. Accordingly, the foldable disk 720 may further improve the quality of sound by providing an acoustic shadow effect from sound of one space (e.g., 730) to sound of the other space (e.g., 740). The foldable disk 720 may be connected in a vertical direction of the terminal as shown in FIG. 7, or connected in a horizontal direction (not shown) of the terminal.

Also, the foldable disk 720 may have a structure in which the volume is changed. The user may increase the volume of the foldable disk 720 and use the same as a dummy head. That is, the terminal case 710 according to an embodiment of the disclosure, by setting the volume of the foldable disk 720 similar to the head or to a specific size, may implement a role of the head to advance the sound.

The foldable disk 720 may perform a mounting role when recording while the terminal is inserted into the terminal case 710.

Figure 8:
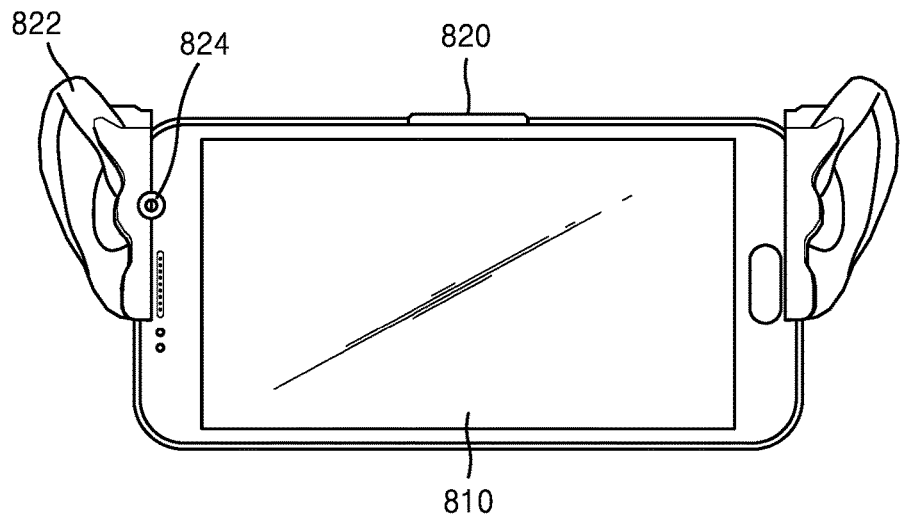
FIG. 8 is a diagram illustrating a sealing member included in a terminal case, according to an embodiment of the disclosure.

FIG. 8 is a diagram illustrating a sealing member 824 included in a terminal case 820, according to an embodiment of the disclosure.

Referring to FIG. 8, the terminal case 820 may include the sealing member 824 to prevent sound collected through a sound collector 822 from leaking out. FIG. 8 illustrates only some elements of the terminal case 820 in order to describe the sealing member 824 included in the terminal case 820. Operations of other elements may be the same as described above with reference to FIG. 3A.

An empty space may exist between the terminal case 820 and the terminal 810 in order to insert or withdraw the terminal 810. Accordingly, even when sound is collected by the sound collector 822 of the terminal case 820, a problem in which the sound leaks out through the empty space may occur. Accordingly, the terminal case 820 may include the sealing member 824 at the edge of a surface on which the sound collector 822 is arranged, thereby preventing the sound from leaking out.

The sealing member 824 illustrated in FIG. 8 is merely an example, and the shape of the sealing member 824 is not limited to the illustrated example. The sealing member 824 may have various shapes to block the empty space between the terminal 810 and the terminal case 820.

Figure 9:
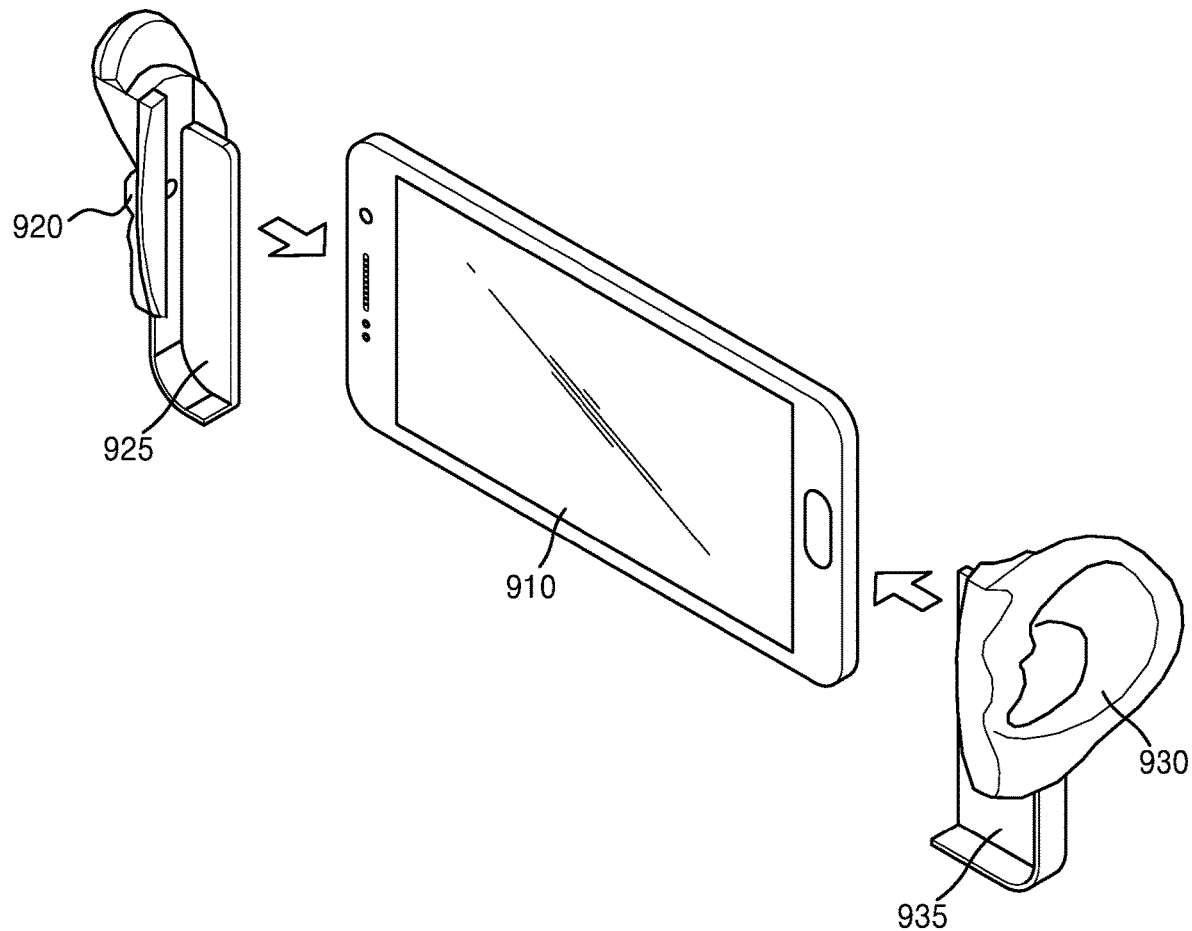
FIG. 9 is a diagram illustrating the structure of a terminal case according to another embodiment of the disclosure.

FIG. 9 is a diagram illustrating the structure of portions 920 and 930 of a terminal case, according to another embodiment of the disclosure.

Referring to FIG. 9, portions 920 and 930 of the terminal case may be spaced apart from each other to surround upper and lower ends of a terminal 910. For example, a first portion 920 of the terminal case may surround the upper end of the terminal 910, and a second portion 930 spaced apart from the first portion 920 may surround the lower end of the terminal 910.

In the embodiment of FIG. 9, a cover 925 of the first portion and a cover 935 of the second portion in the terminal case surround the entire upper and lower surfaces of the terminal 910 respectively, but this is merely an example, and the shape of the cover of each portion may be implemented in various shapes to fix a sound collector of the terminal case around a microphone hole of the terminal 910.

Figure 10:
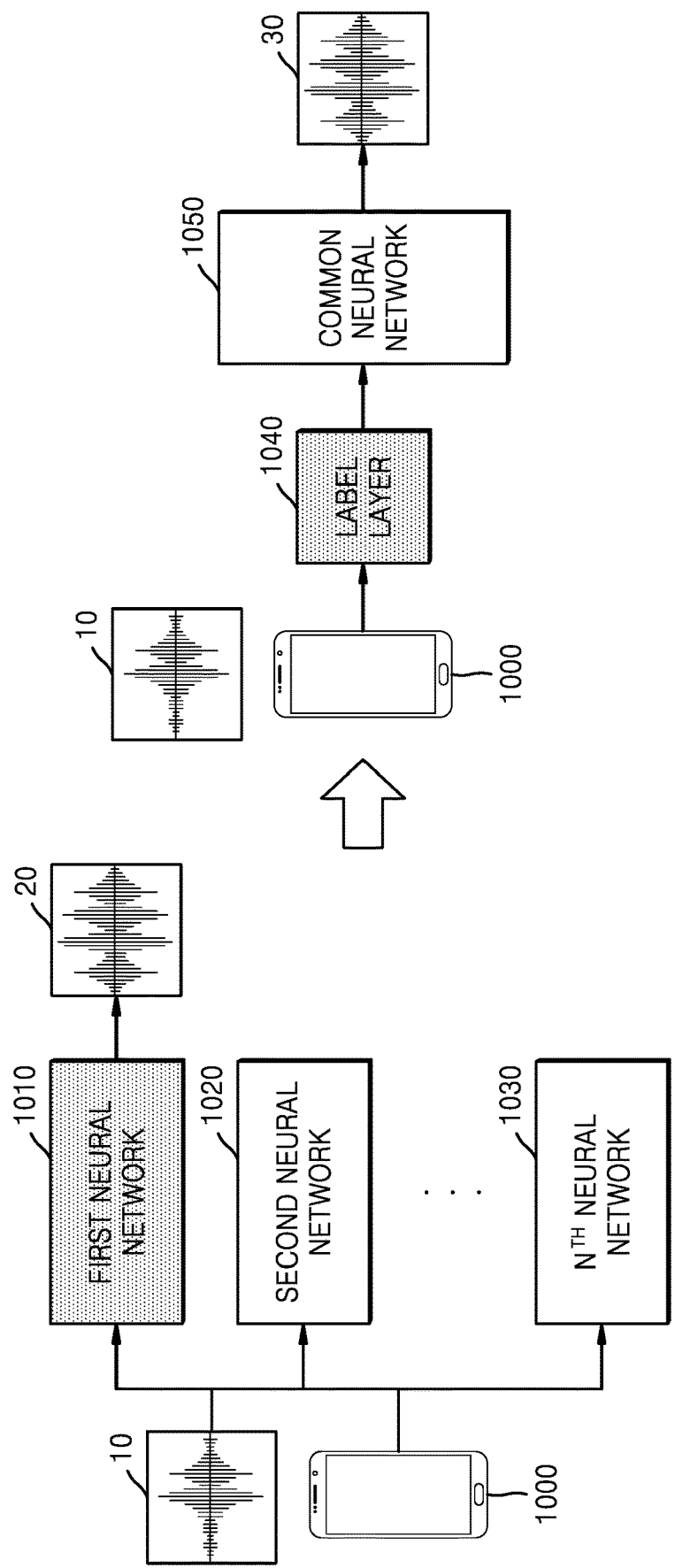
FIG. 10 is a diagram for describing a training network model used to convert sound, according to an embodiment of the disclosure.

FIG. 10 is a diagram for describing a training network model used to convert sound, according to an embodiment of the disclosure.

In order to improve the quality of a result of converting binaural sound data 10 by a terminal 1000, a context at a time of recording the binaural sound data 10 may be an important parameter for determining a conversion method due to the nature of the binaural sound data 10. The reason is because a training network model that does not take into account the context at the time of recording has a higher possibility of having lower performance than a training network model considering the context. Improving the quality of the result of converting the binaural sound data 10 includes further enhancement of sound presence, realism or liveliness, and a neural network through comparison training with high quality sound data may be used. In order to perform conversion in consideration of the context, for example, as illustrated in FIG. 10, there may be a plurality of neural networks 1010, 1020, and 1030 generated as a result of training by the characteristics of a plurality of terminals.

Accordingly, the terminal 1000 needs to download a neural network trained in consideration of the context at the time of recording the binaural sound data 10, and when the context is changed at the time of acquiring other binaural sound data, the neural network needs to be updated again, and thus, a problem that a load of the process of the terminal 1000 is high may occur. For example, the terminal 1000 may acquire binaural sound data 20 converted by using a first neural network 1010 corresponding to the context at the time of recording the binaural sound data 10.

The terminal 1000 according to an embodiment of the disclosure may convert the binaural sound data 10 more easily by using a training network model including a label layer 1040 and a common neural network 1050. In particular, a parameter indicating a context at a time of acquiring the binaural sound data 10 may be applied to the label layer 1040 as an input value. As the parameter indicating the context at the time of acquiring the binaural sound data 10 is applied as the input value, the label layer 1040 may extract, from the binaural sound data 10, characteristic information required for conversion according to the context and transmit the extracted characteristic information to the common neural network 1050 as the input value.

Accordingly, the terminal 1000 according to an embodiment of the disclosure may acquire binaural sound data 30 converted as a result of output of the common neural network 1050. The training network model according to an embodiment of the disclosure, shown in FIG. 10, is merely an example for convenience of explanation, and the label layer 1040 may be placed between or at the end of a plurality of layers constituting the common neural network 1050. In this case, the characteristic information required for conversion according to the context may be extracted from the binaural sound data 10 or the previous layer and transmitted to the common neural network 1050 as the input value.

Figure 11:
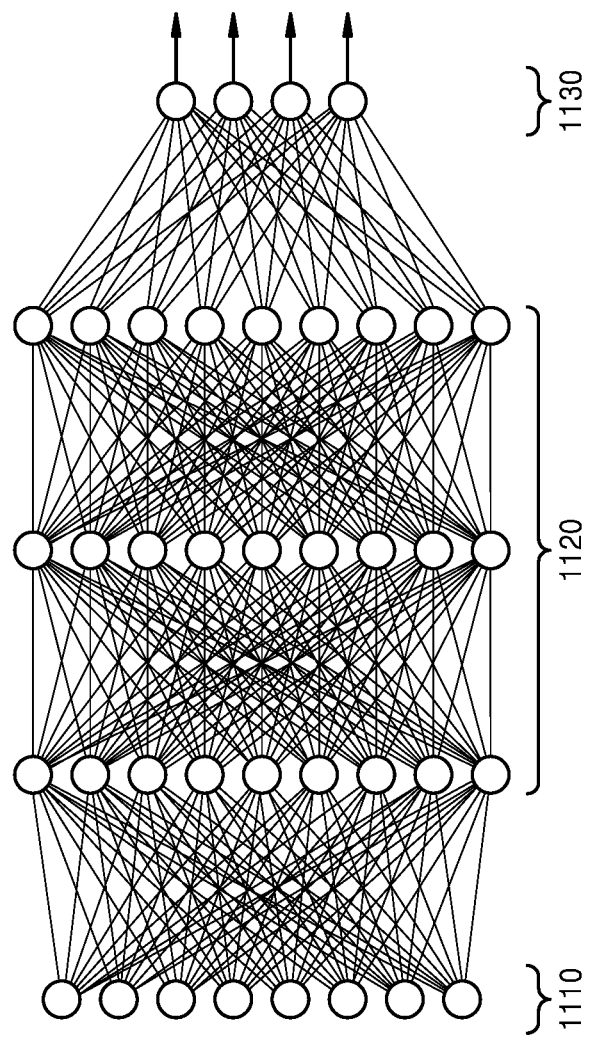
FIG. 11 is a diagram for describing trained data of a training network model, according to an embodiment of the disclosure.
Figure 11:
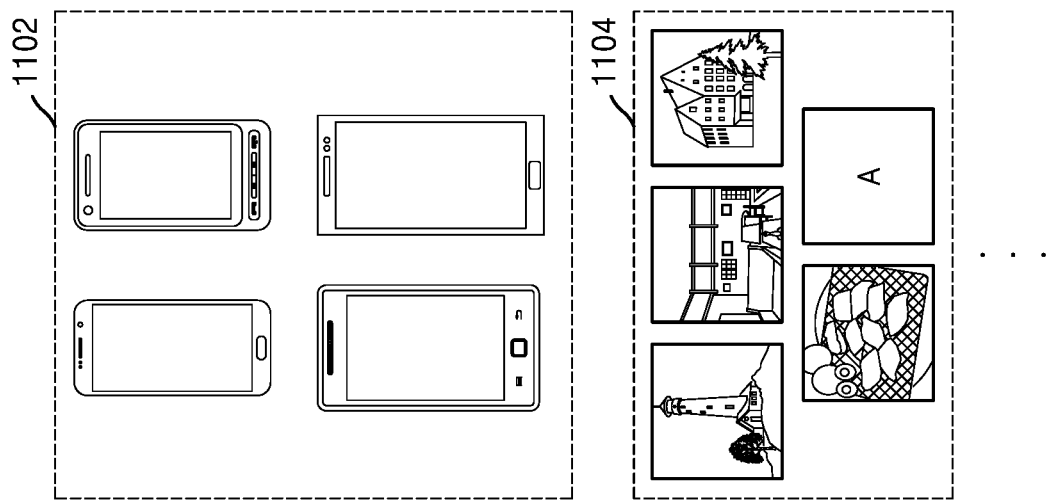

FIG. 11 is a diagram for describing trained data 1102 and 1104 of a training network model, according to an embodiment of the disclosure.

Referring to FIG. 11, the training network model according to the embodiment of the disclosure may include a label layer 1110, a common neural network 1120, and an output layer 1130. In the present embodiment of the disclosure, although the output layer 1130 is shown separately from the common neural network 1120, this is only for convenience of explanation, and the output layer 1130 may be included in the common neural network 1120 as shown in FIG. 10.

A server (not shown) for training a training network model may input various trained data into the label layer 1110 for training. For example, the server (not shown) may input parameters indicating characteristics of various terminals in which binaural sound data is recorded into the label layer 1110 as first trained data 1102. In this regard, the characteristics of the terminals may include a characteristic and an arrangement position of a microphone provided in the terminal but are not limited to the above-described example.

Also, according to another embodiment of the disclosure, a server (not shown) configured to train a training network model may input a parameter indicating a source of binaural sound data into the label layer 1110 as second trained data 1104. As the trained data (e.g., 1102) is input, the label layer 1110 may extract characteristic information required for conversion from the trained data (e.g., 1102) so as to transmit the extracted characteristic information to the common neural network 1120 as an input value apart from the binaural sound data 10. Also, sound data converted as a result of processing in the common neural network 1120 may be output through the output layer 1130.

The server (not shown) may repeatedly perform training through feedback until a result of conversion performed on the binaural sound data output through the output layer 1130 satisfies a preset criterion.

The trained data shown in FIG. 11 is merely an example, and according to another example, setting information regarding a degree of conversion and a direction of conversion of the binaural sound data intended by the user may be additionally considered in training the training network model.

Figure 12:
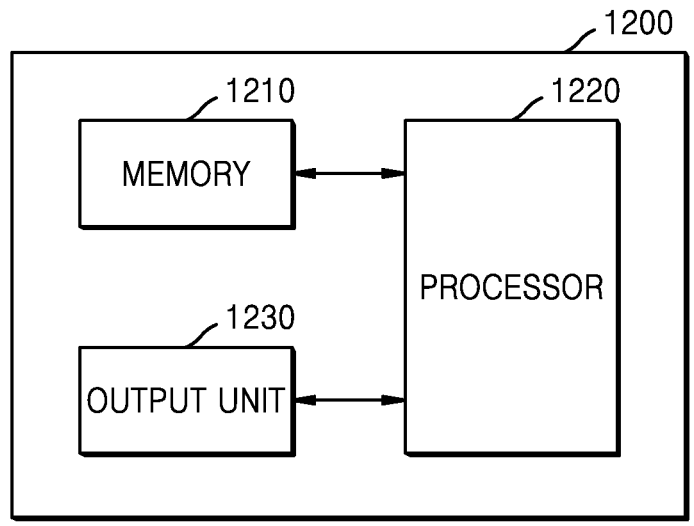
FIG. 12 is a block diagram of a terminal for converting binaural sound data, according to an embodiment of the disclosure.

FIG. 12 is a block diagram of a terminal 1200 for converting binaural sound data, according to an embodiment of the disclosure.

Referring to FIG. 12, the terminal 1200 may include a memory 1210, a processor 1220, and an output unit 1230.

The memory 1210 may store programs (one or more instructions) for processing and control of the processor 1220. The programs stored in the memory 1210 may be divided into a plurality of modules according to functions thereof. According to an embodiment of the disclosure, the memory 1210 includes a data trainer and a data identifier, to be described at a later time with reference to FIG. 13, which may be configured as a software module. Also, the data trainer and the data identifier may each independently include a training network or share one training network model.

The processor 1220 may include one or more cores (not shown) and a graphic processor (not shown) and/or a connection path (e.g., a bus) for transmitting and receiving signals to and from other elements.

The processor 1220 according to an embodiment of the disclosure may perform operations of the terminal described above with reference to FIGS. 1 to 11.

For example, the processor 1220 may acquire binaural sound data. The processor 1220 may convert the binaural sound data by using a previously generated training network model based on a parameter indicating a context at a time of acquiring the binaural sound data. In this regard, the context at the time of acquiring the binaural sound data may be acquired from the above-described terminal case through short-range wireless communications such as NFC or from an input of a terminal user. When NFC is used, the above-described terminal case may have an NFC tag including information corresponding to the above-described context attached thereto. Further, the processor 1220 may control the output unit 1230 to output converted binaural sound data.

The processor 1220 may further include a random access memory (RAM) (not shown) and a read-only memory (ROM) (not shown) temporarily and/or permanently storing a signal (or data) processed in the processor 1220. Also, the processor 1220 may be implemented in the form of a system on chip (SoC) including at least one of the graphic processor, the RAM, or the ROM.

The output unit 1230 may output the converted binaural sound data.

Figure 13:
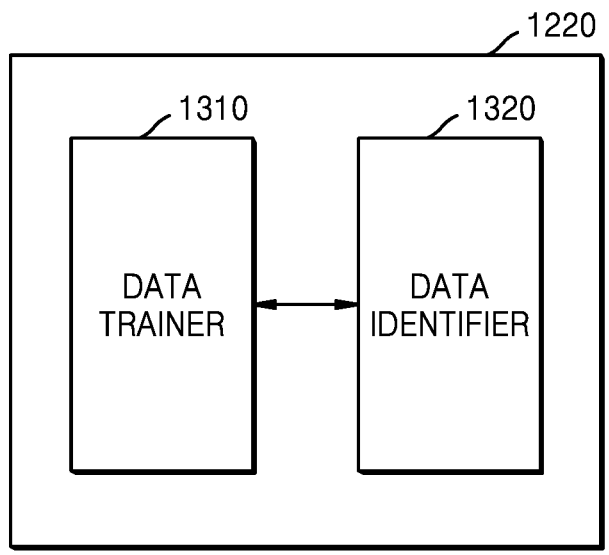
FIG. 13 is a diagram illustrating a processor, according to an embodiment of the disclosure.

FIG. 13 is a diagram illustrating a processor 1220 according to an embodiment of the disclosure.

Referring to FIG. 13, the processor 1220 according to the embodiment of the disclosure may include a data trainer 1310 and a data identifier 1320.

The data trainer 1310 may train a criterion for extracting characteristic information required for converting the binaural sound data based on the parameter indicating the context at the time of acquiring the binaural sound data. Also, the data trainer 1310 may train a criterion for converting the binaural sound data according to a desired degree of conversion based on the extracted characteristic information.

The data identifier 1320 may extract the characteristic information required for converting the binaural sound data based on the criterion trained through the data trainer 1310, and convert the binaural sound data based on the extracted characteristic information.

At least one of the data trainer 1310 or the data identifier 1320 may be manufactured in the form of at least one hardware chip and mounted on the terminal. For example, at least one of the data trainer 1310 or the data identifier 1320 may be manufactured in the form of a dedicated hardware chip for artificial intelligence (AI), or manufactured as part of an existing general purpose processor (e.g., a central processing unit (CPU) or an application processor) or a graphics dedicated processor (e.g., a graphics processing unit (GPU)) and mounted on the aforementioned various terminals.

In this case, the data trainer 1310 and the data identifier 1320 may be mounted on one terminal or mounted on separate terminals, respectively. For example, one of the data trainer 1310 and the data identifier 1320 may be included in the terminal, and the other may be included in the server. Also, model information generated by the data trainer 1310 may be provided to the data identifier 1320 in a wired or wireless manner, or data input to the data identifier 1320 may be provided to the data trainer 1310 as additional trained data.

At least one of the data trainer 1310 or the data identifier 1320 may be implemented as a software module. When at least one of the data trainer 1310 or the data identifier 1320 is implemented as a software module (or a program module including instructions), the software module may be stored in a computer-readable non-transitory computer readable medium. Also, in this case, at least one software module may be provided by an operating system (OS) or by a predefined application. Alternatively, some of the at least one software module may be provided by an OS, and others may be provided by a predefined application.

Figure 14:
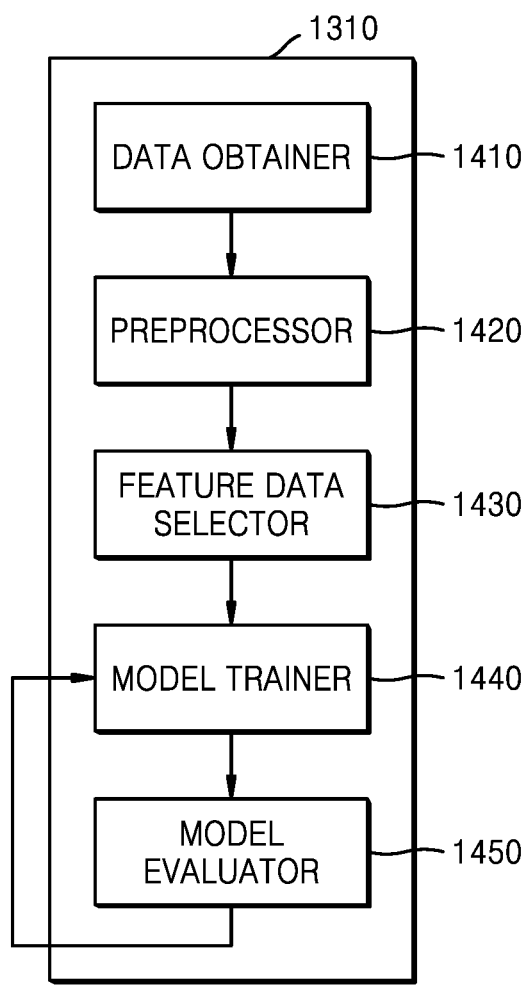
FIG. 14 is a block diagram of a data trainer, according to an embodiment of the disclosure.

FIG. 14 is a block diagram of a data trainer 1310 according to an embodiment of the disclosure.

Referring to FIG. 14, the data trainer 1310 may include a data obtainer 1410, a preprocessor 1420, a trained data selector 1430, a model trainer 1440, and a model evaluator 1450. However, this is merely an example, and the data trainer 1310 may include fewer elements than the above-described elements or may additionally include other elements in addition to the above-described elements.

The data obtainer 1410 may acquire, as trained data, parameters indicating characteristics of various terminals on which binaural sound data is recorded and binaural sound data recorded for each terminal. In another example, the data obtainer 1410 may acquire, as trained data, parameters indicating sources of binaural sound data and binaural sound data recorded for each source.

The preprocessor 1420 may preprocess acquired trained data to allow the acquired trained data to be used in training for conversion of the binaural sound data. The preprocessor 1420 may process, into a preset format, at least one piece of trained data acquired for training such that the model trainer 1440 to be described at a later time may use the at least one piece of trained data.

The trained data selector 1430 may select data required for training from the preprocessed data. The selected data may be provided to the model trainer 1440. The trained data selector 1430 may select data required for training from the preprocessed data based on set criteria.

The model trainer 1440 may train criteria on which information is used from a plurality of layers in a training network model to acquire characteristic information or convert binaural sound data. For example, the model trainer 1440 may train a first criterion on characteristic information extracted from which layer of the plurality of layers included in the training network model should be used to convert the binaural sound data. In this regard, the first criterion may include the type and number of first characteristic information or second characteristic information used to convert the binaural sound data by using the training network model, the type and level of joint operations, and the like.

According to various embodiments of the disclosure, when there are a plurality of pre-constructed data identification models, the model trainer 1440 may determine, as a data identification model to be trained, a data identification model with a high correlation between input trained data and basic trained data. In this case, the basic trained data may be previously classified by the type of data, and the data identification model may be previously constructed by the type of data. For example, the basic trained data may be previously classified based on various criteria such as a region where trained data is generated, a time at which the trained data is generated, a size of the trained data, a genre of the trained data, a creator of the trained data, and a type of an object in the trained data.

Also, the model trainer 1440 may train the data identification model, for example, through reinforcement learning using feedback on whether binaural sound data converted as a result of training is correct.

Also, when the data identification model is trained, the model trainer 1440 may store the trained data identification model. In this case, the model trainer 1440 may store the trained data identification model in a memory of a terminal including the data identifier 1320. Alternatively, the model trainer 1440 may store the trained data identification model in a memory of a terminal including a data identifier 1320 to be described at a later time. Alternatively, the model trainer 1440 may store the trained data identification model in a memory of a server connected to the terminal via a wired or wireless network.

In this case, the memory in which the trained data identification model is stored may store, for example, commands or data related to at least one other element of the terminal. Also, the memory may store software and/or programs. The program may include, for example, a kernel, middleware, an application programming interface (API) and/or an application program (or "application"), and the like.

The model evaluator 1450 inputs evaluation data into the data identification model, and when a result of recognition output from the evaluation data does not satisfy a predetermined criterion, may cause the model trainer 1440 to train again. In this case, the evaluation data may be preset data for evaluating the data identification model. In this regard, the evaluation data may include a matching ratio between binaural sound data converted based on the training network model and binaural sound data converted according to a criterion previously set by a user's intention.

When there are a plurality of training network models, the model evaluator 1450 may evaluate whether each of the training network models satisfies a predetermined criterion and determine a model which satisfies the predetermined criterion as a final training network model.

At least one of the data obtainer 1410, the preprocessor 1420, the trained data selector 1430, the model trainer 1440, or the model evaluator 1450 provided in the data trainer 1310 may be manufactured in the form of at least one hardware chip and mounted on a terminal. For example, at least one of the data obtainer 1410, the preprocessor 1420, the trained data selector 1430, the model trainer 1440, or the model evaluator 1450 may be manufactured in the form of a dedicated hardware chip for artificial intelligence (AI), or manufactured as part of an existing general purpose processor (e.g., a CPU or an application processor) or a graphics dedicated processor (e.g., a GPU) and mounted on the aforementioned various terminals.

Also, the data obtainer 1410, the preprocessor 1420, the trained data selector 1430, the model trainer 1440, and the model evaluator 1450 may be mounted on one terminal, or mounted on separate terminals, respectively. For example, some of the data obtainer 1410, the preprocessor 1420, the trained data selector 1430, the model trainer 1440, and the model evaluator 1450 are included in the terminal, and others may be included in the server.

Also, at least one of the data obtainer 1410, the preprocessor 1420, the trained data selector 1430, the model trainer 1440, or the model evaluator 1450 may be implemented as a software module. When at least one of the data obtainer 1410, the preprocessor 1420, the trained data selector 1430, the model trainer 1440, or the model evaluator 1450 is implemented as a software module (or a program module including instructions), the software module may be stored in a non-transitory computer readable medium. Also, in the case, at least one software module may be provided by an OS or by a predetermined application. Alternatively, some of the at least one software module may be provided by an OS, and others may be provided by a predetermined application.

Figure 15:
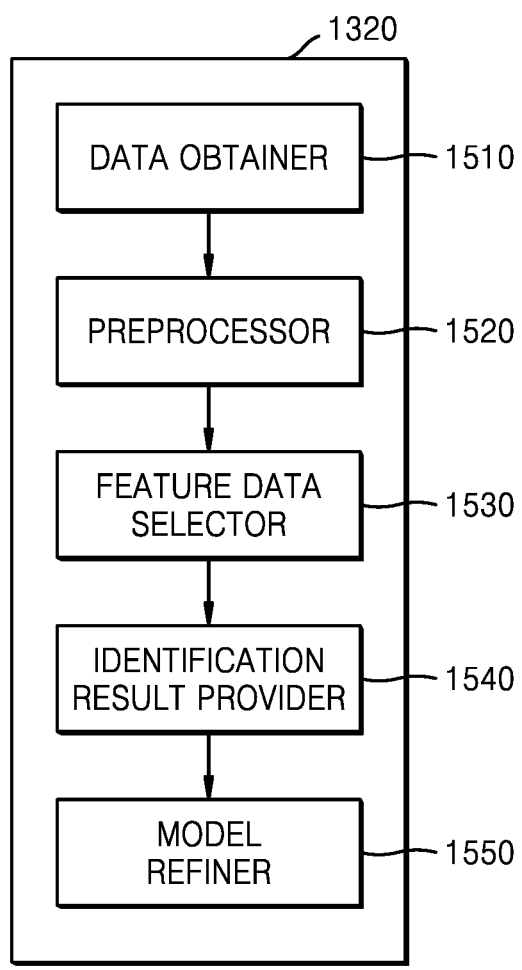
FIG. 15 is a block diagram of a data identifier according to an embodiment of the disclosure.

FIG. 15 is a block diagram of a data identifier 1320 according to an embodiment of the disclosure.

Referring to FIG. 15, the data identifier 1320 according to some embodiments of the disclosure may include a data obtainer 1510, a preprocessor 1520, a feature data selector 1530, a identification result provider 1540, and a model refiner 1550.

The data obtainer 1510 may acquire context information required for converting binaural sound data and the binaural sound data, and the preprocessor 1520 may preprocess the acquired context information and binaural sound data so as to be used, in order to convert the binaural sound data. The preprocessor 1520 may process, into a preset format, the acquired binaural sound data and context information, such that the identification result provider 1540 to be described below may use the acquired binaural sound data and context information for extracting characteristic information or converting the binaural sound data. The feature data selector 1530 may select data required for converting the binaural sound data from among the preprocessed data. The selected data may be provided to the identification result provider 1540.

The identification result provider 1540 may convert the binaural sound data by applying the selected data to a training network model according to an embodiment of the disclosure. The identification result provider 1540 may provide the converted binaural sound data.

The model refiner 1550 may provide information about an evaluation to the aforementioned model trainer 1440 described above with reference to FIG. 14, such that parameters of a species classification network included in the training network model or at least one characteristic extraction layer may be modified and refined based on an evaluation of a result of conversion performed on the binaural sound data provided by the identification result provider 1540.

At least one of the data obtainer 1510, the preprocessor 1520, the feature data selector 1530, the identification result provider 1540, or the model refiner 1550 provided in the data identifier 1320 may be manufactured in the form of at least one hardware chip and mounted on a terminal. For example, at least one of the data obtainer 1510, the preprocessor 1520, the feature data selector 1530, the identification result provider 1540, or the model refiner 1550 may be manufactured in the form of a dedicated hardware chip for AI, or manufactured as part of an existing general purpose processor (e.g., a CPU or an application processor) or a graphics dedicated processor (e.g., a GPU) and mounted on the aforementioned various terminals.

Also, the data obtainer 1510, the preprocessor 1520, the feature data selector 1530, the identification result provider 1540, and the model refiner 1550 may be mounted on one terminal, or mounted on separate terminals, respectively. For example, some of the data obtainer 1510, the preprocessor 1520, the feature data selector 1530, the identification result provider 1540, or the model refiner 1550 may be included in the terminal, and others may be included in the server.

Also, at least one of the data obtainer 1510, the preprocessor 1520, the feature data selector 1530, the identification result provider 1540, or the model refiner 1550 may be implemented as a software module. When at least one of the data obtainer 1510, the preprocessor 1520, the feature data selector 1530, the identification result provider 1540, or the model refiner 1550 is implemented as a software module (or a program module including instructions), the software module may be stored in a computer-readable non-transitory computer readable medium. Also, in this case, at least one software module may be provided by an OS or by a predetermined application. Alternatively, some of the at least one software module may be provided by an OS, and others may be provided by a predetermined application.

Figure 16:
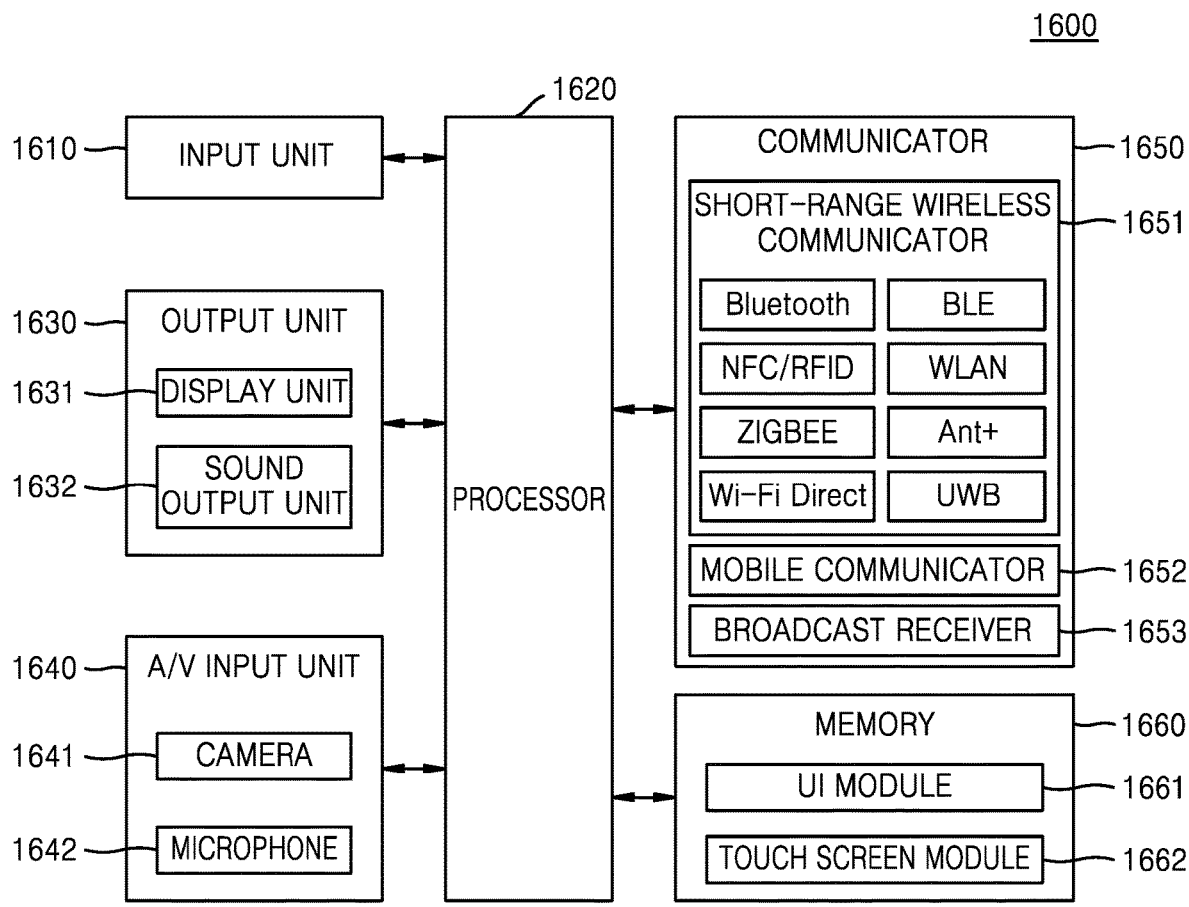
FIG. 16 is a block diagram of a terminal, according to another embodiment of the disclosure.

FIG. 16 is a block diagram of a terminal 1600 according to another embodiment of the disclosure.

Referring to FIG. 16, the terminal 1600 according to the embodiment of the disclosure may include a memory 1660, a processor 1620, and an output unit 1630 which respectively correspond to the memory 1210, the processor 1220, and the output unit 1230 in FIG. 12, and further include an input unit 1610, an audio/video (A/V) input unit 1640, and a communicator 1650.

The input unit 1610 is referred to as a means by which a user input data for controlling the terminal 1600. For example, the input unit 1610 may include, but is not limited to, a key pad, a dome switch, a touch pad (a touch capacitive type touch pad, a pressure resistive type touch pad, an infrared beam sensing type touch pad, a surface ultrasound conduction type touch pad, an integral strain gauge type touch pad, a piezoelectric effect type touch pad, or the like), a jog wheel, a jog switch, and the like.

The processor 1620 generally controls the overall operation of the terminal 1600 and a signal flow between internal elements of the terminal 1600, and performs a function of processing data. For example, the processor 1620 may generally control, by executing programs (one or more instructions) stored in the memory 1660, the input unit 1610, the output unit 1630, the A/V input unit 1640, and the communicator 1650.

According to an embodiment of the disclosure, the processor 1620 may control elements of the terminal 1600 to convert the binaural sound data by using the training network model, in order to perform the functions of the terminal 1200 described above with reference to FIGS. 1 to 11. The processor 1620 corresponds to the processor 1220 in FIG. 12, and thus detailed descriptions thereof are not provided here.

The output unit 1630 may include a display unit 1631 and a sound output unit 1632.

The display unit 1631 displays and outputs information processed by the terminal 1600. When the display unit 1631 and a touch pad form a layer structure and thus are formed as a touch screen, the display unit 1631 may be used as both an input device and an output device.

The sound output unit 1632 may output converted binaural sound data.

The A/V input unit 1640 may include a camera 1641, a microphone 1642, or the like.

The camera 1641 captures an image within a camera recognition range. According to an embodiment of the disclosure, the image captured by the camera 1641 may be image-processed by the processor 1620, and displayed and output via the display unit 1631.

The microphone 1642 is provided for recording the binaural sound data, and one microphone 1642 is illustrated in FIG. 16. However, the aforementioned embodiment is only for convenience of descriptions, and a plurality of microphone may be included in the terminal 1600.

The communicator 1650 may include one or more elements configured to enable communications with an external server (e.g., an application management server, a cloud server, a content providing server, etc.) and other external devices. For example, the communicator 1650 may include a short-range wireless communicator 1651, a mobile communicator 1652, and a broadcast receiver 1653.

The short-range wireless communicator 1651 may include a Bluetooth communicator, a Bluetooth low energy (BLE) communicator, a near field communicator, a WLAN (Wi-Fi) communicator, a Zigbee communicator, an infrared data association (IrDA) communicator, a Wi-Fi Direct (WFD) communicator, a ultra wideband (UWB) communicator, an Ant+ communicator, and the like, but are not limited thereto.

The mobile communicator 1652 transmits and receives a radio signal to and from at least one of a base station, an external terminal, or a server on a mobile communication network. In this regard, the radio signal may include various types of data according to content transmission and reception.

The broadcast receiver 1653 receives a broadcast signal and/or broadcast related information from the outside via a broadcast channel. According to an embodiment of the disclosure, the terminal 1600 may not include the broadcast receiver 1653.

The memory 1660 may store programs (e.g., one or more instructions and a training network model) for processing and controlling the processor 1620 or data (e.g., a result of conversion performed on the binaural sound data) input to or output from the terminal 1600.

The programs stored in the memory 1660 may be classified into a plurality of modules according to functions thereof. For example, the programs may be classified into a UI module 1661, a touch screen module 1662, and the like.

The UI module 1661 may provide a specialized UI, GUI, and the like, which are linked to the terminal 1600 for each application. The touch screen module 1662 may detect a user's touch gesture on a touch screen, and transmit information about the touch gesture to the processor 1620. The touch screen module 1662 according to an embodiment of the disclosure may recognize and analyze a touch code. The touch screen module 1662 may be configured as separate hardware including a controller.

The memory 1660 may include at least one type of storage medium of a flash memory type, a hard disk type, a multimedia card micro type, a card type memory (e.g., Secure Digital (SD) or extreme Digital ($_x$D) memory, etc.), a RAM, a static random access memory (SRAM), a ROM, an electrically erasable programmable read-only memory (EEPROM), a programmable read-only memory (PROM), a magnetic memory, a magnetic disk, or an optical disk.

The structure of the terminal 1600 shown in FIG. 16 is an embodiment of the disclosure, and each element of the terminal 1600 may be integrated, added, or omitted according to the specifications of a terminal to be implemented. That is, two or more elements may be combined into one element, or one element may be divided into two or more elements, as needed. Also, a function performed by each element (or module) is for the purpose of describing the embodiments of the disclosure, and a specific operation or device thereof does not limit the scope of the disclosure.

Figure 17:
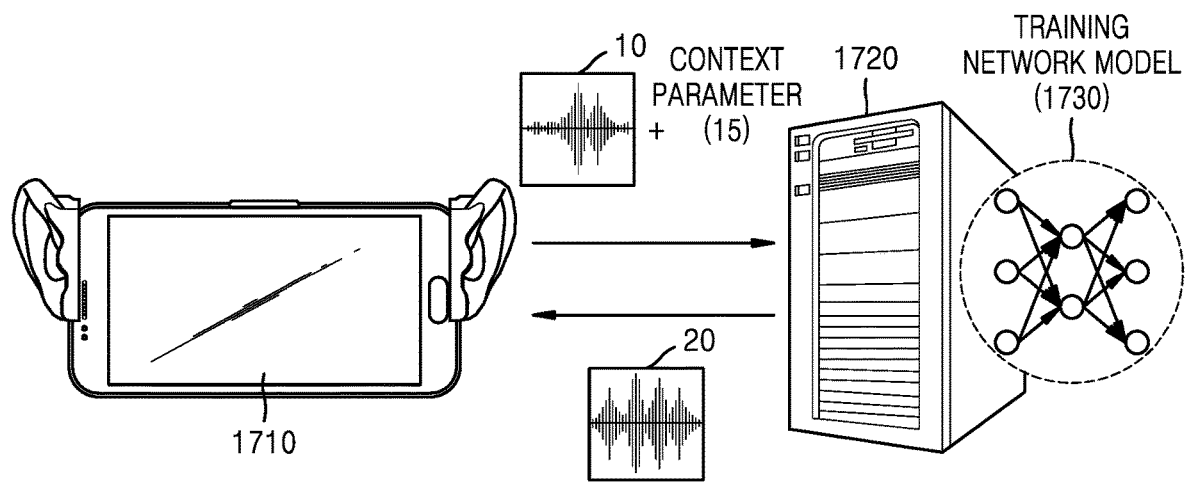
FIG. 17 is a diagram for describing a method, performed by a terminal, of converting binaural sound data using a server, according to another embodiment of the disclosure.

FIG. 17 is a diagram for describing a method by which a terminal 1710 converts binaural sound data 10 through a server 1720, according to another embodiment of the disclosure.

Referring to FIG. 17, the terminal 1710 according to the embodiment of the disclosure may acquire the binaural sound data 10. The terminal 1710 may provide the server 1720 with a parameter (hereinafter referred to as a context parameter 15) indicating a context at a time of acquiring binaural sound data along with the acquired binaural sound data 10.

As the binaural sound data 10 and the context parameter 15 are received from the terminal 1710, the server 1720 may convert the binaural sound data 10 by using a previously generated training network model 1730, based on the received binaural sound data 10 and context parameter 15. In this regard, the previously generated training network model 1730 may correspond to the training network model described above with reference to FIGS. 1 to 16.

The server 1720 may provide converted binaural sound data 20 to the terminal 1710. As the converted binaural sound data 20 is received from the server 1720, the terminal 1710 may output the converted binaural sound data 20.

The terminal according to an embodiment of the disclosure may store a training network model capable of performing conversion suitable for the binaural sound data in consideration of the context at the time of acquiring the binaural sound data. For example, when a characteristic of a microphone included in the terminal, an arrangement position of the microphone, etc. are input as a parameter to the training network model, a structure of a layer and a parameter of the layer suitable for conversion may be determined, in consideration of a characteristic and an arrangement position of a microphone in which binaural sound data is recorded.

The above-described embodiments of the disclosure may be written by a computer executable program and implemented in a general-purpose digital computer that operates the program by using a computer-readable recording medium.

Examples of the computer-readable recording medium include a magnetic storage medium (e.g., a ROM, a floppy disk, a hard disk, etc.), an optical reading medium (e.g., a CD-ROM, a DVD, etc.), and a carrier wave (e.g., transmission over the Internet).

While the disclosure has been particularly shown and described with reference to embodiments and drawings thereof, it will be understood by one of ordinary skill in the art that various changes in form and details may be made therein without departing from the spirit and scope of the disclosure as defined by the following claims. Hence, it will be understood that the embodiments of the disclosure described above are not limiting of the scope of the disclosure.

What is claimed is:

1. A terminal case attachable to a terminal, the terminal case comprising:
    a cover having a cover hole formed in a surface of the cover, and being configured so that, when the terminal case is attached to the terminal,
        the cover surrounds at least one of a left side surface, a right side surface, an upper side surface, a lower side surface, and a rear surface, of the terminal, and
        the surface in which the cover hole is formed is in contact with a surface of the terminal in which a microphone hole is formed;
    a sound collector to collect sound and arranged on the surface of the cover in which the cover hole is formed so that, when the terminal case is attached to the terminal, the collected sound is introduced through the cover hole into the microphone hole; and
    a foldable disk connected to a rear surface of the cover and configured to generate left and right separation of sound when the sound is collected to be introduced through the cover hole into the microphone hole,
    wherein the sound collector has an asymmetrical shape to cause at least one of resonance, reflection, and diffraction of the collected sound.

2. The terminal case of claim 1, further comprising a rotating plate arranged between the sound collector and the cover and configured to rotate the sound collector.

3. The terminal case of claim 1, further comprising a sliding plate configured to connect the sound collector to the cover to allow the sound collector to slide in a vertical direction.

4. The terminal case of claim 1, further comprising an acoustic tube configured to connect the cover hole to the microphone hole.

5. The terminal case of claim 1, further comprising a sealing member arranged to surround the cover hole and configured to prevent the collected sound introduced into the microphone hole from leaking out.

6. The terminal case of claim 1, further comprising a plate body protruding toward a front surface of the sound collector and configured to reflect sound around the sound collector.

7. The terminal case of claim 1, further comprising a guide protrusion connected to the surface of the cover in which the cover hole is formed, and configured to guide the terminal to slide into the cover when the terminal case is being attached to the terminal.

8. The terminal case of claim 1, wherein the sound collector has a non-equivariant free curve shape of which an area becomes wider in a height direction from the cover hole.

9. The terminal case of claim 1, wherein the sound collector has a shape of an auricle of a human body.

\* \* \* \* \*